A. S. BALLARD & T. L. SERGENT.
APPARATUS FOR STEAMING GRAIN.
No. 44,151. Patented Sept. 13, 1864.
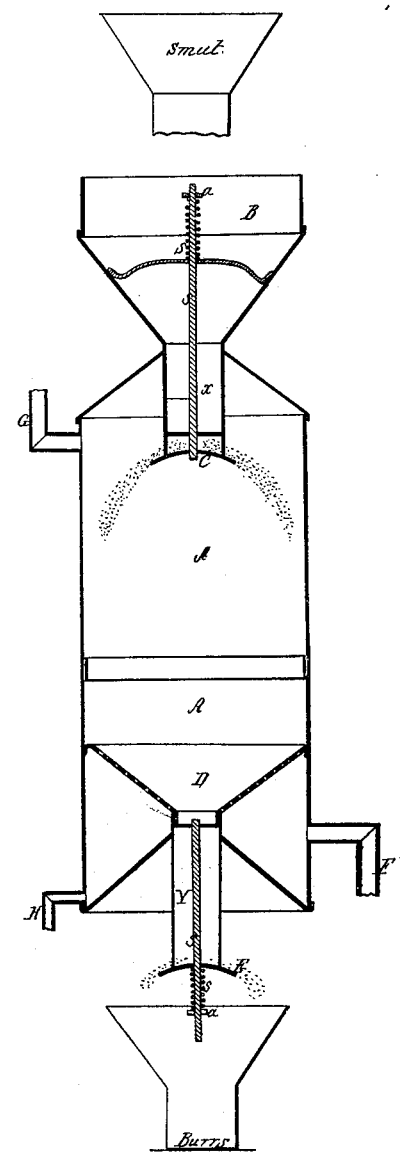

UNITED STATES PATENT OFFICE.

ALLEN S. BALLARD AND THOMAS L. SERGENT, OF MOUNT PLEASANT, IOWA.

IMPROVEMENT IN APPARATUS FOR STEAMING GRAIN.

Specification forming part of Letters Patent No. 44,151, dated September 13, 1864.

*To all whom it may concern:*

Be it known that we, ALLEN S. BALLARD and THOMAS L. SERGENT, of Mount Pleasant, in the State of Iowa, have invented a new and useful mode of using steam for toughening the husks of grain before grinding; and we do hereby declare that the following is a full and exact description thereof, reference being had to the accompanying drawing, and to the letters of reference thereon marked.

The drawing represents a vertical section of the drum apparatus which constitutes our invention.

To enable those skilled in the art to make and use our invention, we will describe its construction and operation.

The nature of our invention consists in a new and useful apparatus for applying steam to grain before it is ground, so as to toughen the husk or bran.

It is well known among millers that the older any grain becomes the more brittle it is, and consequently in grinding, the husk is cut up in very small pieces so that there is much difficulty in bolting, and much flour is wasted. Our invention is designed to overcome this quality of grain, which occasions so much difficulty to millers and adds so much to the price of the finer grades of flour. We have proven by satisfactory experiments that the suitable application of steam to grain, a short while before grinding it, will toughen the husk so that it will "cup up" less and peel off in larger pieces, leaving less flour on it and less bran in the flour than when it is not steamed.

A is cylindrical drum of any suitable size—say twelve inches in diameter and forty inches long—made in two sections so as to be readily taken apart for cleansing or repairing.

B is the receiving-hopper, made on the top of the upper section of drum A. The throat of the hopper is contracted so as to form a spout or pipe, X, about two or three inches in diameter and extending about a foot below the top of the drum.

C is a valve that cuts off the flow of grain from the hopper. It is provided with a valve-rod and spring s, and is regulated by means of the set-screw a.

In the bottom of the lower section of the drum is a perforated hopper, D, through which the steam is passed and spread as through a "sprinkling-nozzle." The throat of this hopper D is also provided with a pipe, Y, similar to pipe X, a valve, E, similar to valve C, and operated in like manner by a valve-rod and spring s, and set-screw a. Through this valve the steamed grain escapes. The weight of the grain opens the valves.

F is the steam-pipe which supplies the apparatus with steam from a suitable boiler. The steam is admitted at the bottom of the drum under the perforated hopper, through which it must pass before coming in contact with the grain.

G is the waste-pipe for the escape of the steam after it has performed its function.

H is a small pipe in bottom of drum for the escape of the condensed steam.

In the operation of our invention the apparatus, as above described, may be used disconnected from the smut-machine and the burrs, according to the convenience of the miller using it. We prefer building it so that the grain may be discharged directly from the smut-machine (as lines marked "smut") into the hopper B, and after it is steamed to escape from the apparatus directly into the hopper of the burrs, (see lines marked "burrs.") As the grain (wheat, corn, barley, &c.) is fed into the hopper B, it passes down pipe X and falls upon the convex top of valve C, which scatters it out so as to insure every grain an equal contact with the steam, which is at the same time rushing up through the scattering hopper and sprinkler D. As the grain falls, it rests an for instant upon the hopper D, and then passes through discharge-pipe Y and valve E, either into the burr-hopper or into a vessel to be afterward emptied into that hopper, the waste steam in the meantime escaping through pipe G and the condensed steam running out at pipe H.

Having described our invention, what we claim as new, and desire to secure by Letters Patent, is—

Steaming grain, for the purposes specified, by means of drum A, hoppers B and D, valves C and E, steam-pipe F, and waste-pipes G and H, constructed and operating substantially as set forth.

ALLEN S. BALLARD.
THOMAS L. SERGENT.

Witnesses:
C. B. MINSHALL,
O. J. GRUBB.